3,663,630
OXIDATIVE DEHYDROGENATION OF 1-BUTENES

Roger M. Bean, Glen Mills, Pa., assignor to Sun Oil Company, Philadelphia, Pa.
No Drawing. Filed Sept. 17, 1970, Ser. No. 73,214
Int. Cl. C07c 5/18, 11/12
U.S. Cl. 260—680 E     7 Claims

ABSTRACT OF THE DISCLOSURE

Process for oxydehydrogenation of a 1-butene of structure

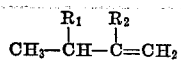

$$CH_3-CH-C=CH_2$$
        $R_1$  $R_2$ where $R_1$ is hydrogen or lower alkyl and $R_2$ is lower alkyl to form the corresponding 1,4-diolefin by contacting said 1-butene with oxygen at elevated temperature and in the presence of a sodium or calcium type A molecular sieve catalyst.

---

It is known in the art to subject various hydrocarbons to oxidative dehydrogenation procedures. U.S. 3,308,181 (E. W. Pitzer, assigned to Phillips Petroleum Co., issued Mar. 7, 1967) discloses broadly the oxidative dehydrogenation of saturated and unsaturated organic compounds using an iron oxide type catalyst or any type of dehydrogenation catalyst. When reacting mono-olefins, however, the disclosure states as particularly useful as a catalyst a potassium promoted iron oxide stabilized with a small amount of chromium oxide.

As is well known, catalytic processes are generally highly specific and this specificity also applies to catalysts for oxidative dehydrogenation. For example, it has been found that butenes are not equally responsive to catalysts in oxidative dehydrogenation reactions and this is particularly true when the catalysts employed are molecular sieves. Thus, in the oxidative dehydrogenation of 1-butenes such as 2-methylbutene-1 and 2,3-dimethylbutene-1 to the corresponding butadienes, the potassium forms of A type molecular sieves and alkali metal forms of Y type sieves are either quite poor or inoperable. In view of this it is surprising to find that the sodium and calcium forms of an A type molecular sieve is effective for oxidative dehydrogenation of alkyl substituted 1-butenes to butadienes. This is further unexpected in view of the inoperability of the same molecular sieve catalysts for oxidative dehydrogenation of the parent 1-butene itself.

Thus, in accord with this invention there is provided a process for preparation of alkyl-substituted butadienes, which compounds are known to be polymer intermediates, cross-linking agents, and the like, by oxydehydrogenation of a 1-butene of structure

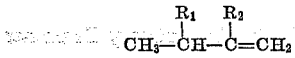

$$CH_3-CH-C=CH_2$$
        $R_1$  $R_2$ where $R_1$ is hydrogen or lower alkyl and $R_2$ is lower alkyl, in the presence of a sodium or calcium type A molecular sieve as catalyst.

As indicated by the structural formula given above, the 1-butenes used in the reaction will have at least one lower alkyl group substituted on the two position carbon atom and may have an additional lower alkyl group on the three position carbon atom. By lower alkyl group is meant a hydrocarbon group of one to four carbon atoms; e.g., methyl, ethyl, propyl and butyl groups. Preferably, the process of the invention will be carried out with those compounds where $R_1$ is hydrogen or methyl and $R_2$ is methyl, e.g., 2-methylbutene-1 and 2,3-dimethylbutene-1.

In carrying out the process the 1-butene, oxygen, and optionally, a diluent such as helium, nitrogen and other inert gas is passed over the catalyst at the desired temperature and the product is recovered from the reaction mixture. Recycle of the unconverted charge is utilized in substantially all applications. The catalyst chambers may be adiabatic or isothermal, although isothermal reactors are more desirable from a processing point of view.

The temperature of reaction will generally be between about 400° C. to about 700° C., with about 500° to about 600° C. being preferred. Temperatures below about 400° results in reduced conversions and at temperatures much above 600° C. selectivity falls below desirable limits.

It will be understood by those skilled in the art that over-all yield per pass of product is the product of the conversion and the selectivity. The term "yield" as used herein refers to yield per pass of product. In general, the operating conditions of temperature, space velocity, etc. will be chosen to obtain a conversion consistent with economic considerations. It is readily apparent that at higher conversion levels less separation and recycle of dehydrogenatable feed are required. Inasmuch as conversion and selectivity are inversely related under a given set of conditions, i.e., as conversion level is increased selectivity decreases, the choice of a conversion level is dictated by the destruction of feed that can be tolerated. Therefore, any means that permits operating at a higher conversion level with the same selectivity or at the same conversion level with a higher selectivity is highly desirable. The process of this invention provides such a means. Having chosen the desired conversion, the greater the selectivity the greater the per-pass yield of desired product.

The molar ratio of oxygen to 1-butene employed will vary preferably from 2:1 to 1:2, but may be outside this ratio. However, yield or selectivity will probably decrease if this ratio is exceeded.

The preferred pressure is near atmospheric, e.g., 5 to 75 p.s.i.a. On the other hand, higher pressures up to about 300 p.s.i.a. can be used, and have the advantage of simplifying the product recovery.

The process of the present invention allows a high space velocity, and thus, comparatively small reactors and catalyst can be used. For example, gaseous hourly space velocities up to about 5000 may be employed while still obtaining reasonable conversions. Gaseous hourly space velocity, abbreviated GHSV, is defined as the volumes of reactant vapor calculated under standard condition (STP) passed per hour per unit volume of the catalyst bed. Generally, space velocities between about 50 and 1200 are very satisfactory.

The contact of the feed vapors, oxygen and inert gas if any, is preferably effected by providing the catalyst in the form of a fixed bed maintained at the reaction temperature, and passing the feed vapors through the bed. In this method of operation the partial pressure of oxygen is high (maximum) at the inlet of the catalyst bed and declines towards the outlet. The concentration of diolefin product, on the other hand, is substantially zero at the inlet of the bed and maximum at the outlet. This allows very high selectivities to be achieved. It is also possible to use the catalyst in powder forms, but certain precautions should be taken. Thus, the powdered catalyst (e.g., passing a 100 mesh U.S. standard sieve) can be dispersed in the reactant vapor mixtures and the dispersion passed through the reaction zone.

The gaseous mixture issuing from the reaction zone may be quenched but this is normally not essential. Except in some cases when operating at the upper limit of the recommended temperatures there is little tendency for side reactions to take place. The effluent is preferably cooled by indirect heat exchange with the feed and then washed with dilute caustic to neutralize the organic acids present and condense and remove the steam. If air is used to supply the oxygen the remaining mixture is preferably compressed and scrubbed with oil to separate the hydrocarbons from the nitrogen, carbon dioxide, and carbon monoxide. The hydrocarbon may be stripped from the oil and subject to an extractive distillation or a copper ammonium acetate treatment in the known manner to separate and recover the diolefin.

As indicated, the catalysts operable in the process are A type molecular sieves in sodium and calcium form. These materials are well known and are characterized as crystalline zeolitic molecular sives and have effective pore sizes of 4 A. for sodium and 5 A. for calcium. References to such molecular sieves may be found in U.S. 3,140,252 (Vincent J. Frilette and Paul B. Weisz, issued July 7, 1964) and the Kirk-Othmer Encyclopedia of Chemical Technology.

In order to further illustrate the process of the invention the following examples are given.

EXAMPLE 1 (539943)

A gaseous mixture of helium, oxygen and 2,3-dimethylbutene-1 at a mole ratio of 4:1:1 was passed over a catalyst of 20 to 30 mesh particles of the calcium form of an "A" type molecular sieve (Linde 5A) at 500° C. and at a gaseous hourly space velocity of 1125. The product was condensed as it exited from the reactor and analysis indicated a 41.4% conversion of the 2,3-dimethylbutene-1 to 2,3-dimethylbutadiene with a selectivity of 63.8%.

EXAMPLE 2

Example 1 was repeated, but at 600° C. In this instance a 44.2% conversion to 2,3-dimethylbutadiene was obtained at 46.4% selectivity.

When the run was repeated at 600° C., but without oxygen, only 3% conversion to the 2,3-dimethylbutadiene was obtained.

EXAMPLE 3

Following the details of Example 1, numerous runs were made under various conditions. The details of reaction conditions and results are given in the following table.

TABLE

| Olefin reactant | Mol sieve used | Temperature, °C. | Product diene | Weight percent conversion | Percent selectivity |
|---|---|---|---|---|---|
| 2,3-dimethylbutene-1 | Calcium form (Linde 5A) | 500 | 2,3-dimethylbutadiene | 33.3 | 66.4 |
| 2-methylbutene-1 | do | 500 | 2-methylbutadiene | 19.8 | 50.0 |
| Butene-1 | do | 500 | Butadiene | ~10 | <10 |
| 2,3-dimethylbutene-1 | Sodium form (Lind 4A) | 500 | 2,3-dimethylbutadiene | 18.9 | 59.8 |
| Do | do | 600 | do | ~24 | ~40 |
| 2-methylbutene-1 | do | 500 | 2-methylbutadiene | 14.9 | 24.8 |
| Do | do | 600 | do | 24.5 | 35.9 |
| Butene-1 | do | 500 | Butadiene | ~6 | <20 |
| 2,3-dimethylbutene-1 | Potassium form (Linde 3A) | 500 | 2,3-dimethylbutadiene | 3.5 | (1) |
| Do | do | 600 | do | 19 | 19.5 |
| 2-methylbutene-1 | do | 600 | Butadiene | 12 | 27.5 |
| 2,3-dimethylbutene-1 | Sodium "Y" sieve | 500 | 2,3-dimethylbutadiene | 17 | 5 |

1 None detected.

It is clear from the above table that only the calcium and sodium form molecular sieve catalysts yield any significant conversion and selectivity to diene product. And even these catalysts are not very effective with butene-1. Furthermore, the sodium "Y" type molecular sieve is a poor catalyst for oxydehydrogenation of 2,3-dimethylbutene-1, as shown in the table, thus again showing the very high specificity of the systems involved.

The invention claimed is:

1. The process of oxydehydrogenating a 1-butene of structure

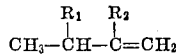

where $R_1$ is hydrogen or lower alkyl and $R_2$ is lower alkyl to form the corresponding diolefin, which comprises contacting said butene with oxygen at about 400° C. to about 700° C., and in the presence of a sodium or calcium Type A molecular sieve catalyst.

2. The process of claim 1 where the 1-butene is 2,3-dimethylbutene-1.

3. The process of claim 1 where the 1-butene is 2-methylbutene-1.

4. The process of claim 2 where the molecular sieve is in the calcium form.

5. The process of claim 2 where the molecular sieve is in the sodium form.

6. The process of claim 3 where the molecular sieve is in the calcium form.

7. The process of claim 3 where the molecular sieve is in the sodium form.

References Cited
UNITED STATES PATENTS

| 3,140,322 | 7/1964 | Frilette et al. | 260—667 |
| 3,236,910 | 2/1966 | Bukata et al. | 260—683.3 |
| 3,448,162 | 6/1969 | Michaels | 260—680 |
| 3,562,797 | 2/1971 | Hu | 260—680 X |

PAUL M. COUGHLAN, Jr., Primary Examiner